United States Patent [19]

Orenstein et al.

[11] Patent Number: 4,839,416
[45] Date of Patent: Jun. 13, 1989

[54] LOW TACK MICROSPHERE ADHESIVE

[75] Inventors: Richard A. Orenstein, Longmeadow; Arthur F. Dionne, Wilbraham, both of Mass.

[73] Assignee: Ampad Corporation, Holyoke, Mass.

[21] Appl. No.: 59,797

[22] Filed: Jun. 9, 1987

[51] Int. Cl.$^4$ .......................... C08F 2/30; C08F 20/10
[52] U.S. Cl. ..................................... 524/558; 524/560; 526/88; 526/328; 521/56
[58] Field of Search .................. 526/88, 328; 524/560, 524/558

[56] References Cited

U.S. PATENT DOCUMENTS

| | | | |
|---|---|---|---|
| 3,615,972 | 10/1971 | Morehouse, Jr. et al. | 521/56 |
| 3,620,988 | 11/1971 | Cohen | 260/17.4 |
| 3,691,140 | 9/1972 | Silver | 524/829 |
| 3,912,581 | 10/1975 | Fink | 162/164 |
| 4,049,604 | 9/1977 | Morehouse, Jr. et al. | 526/203 |
| 4,166,152 | 8/1979 | Baker et al. | 526/328 |
| 4,495,318 | 1/1985 | Howard | 524/376 |
| 4,598,112 | 7/1986 | Howard | 524/460 |

*Primary Examiner*—Morton Foelak
*Attorney, Agent, or Firm*—Fishman, Dionne & Cantor

[57] ABSTRACT

Inherently tacky, elastomeric, solvent-dispersible, solvent insoluble polymeric microspheres prepared using non-ionic suspension stabilizers and non-ionic emulsifiers.

2 Claims, No Drawings

LOW TACK MICROSPHERE ADHESIVE

BACKGROUND OF THE INVENTION

The present invention relates to an inherently tacky polymeric microspheres which are solvent-dispersible, solvent-insoluble and elastomeric in nature. In particular, this invention relates to said tacky polymeric microspheres which are prepared employing a non-ionic suspension polymerization system.

In U.S. Pat. No. 3,691,140 to Silver, there are disclosed inherently tacky acrylate copolymer microspheres comprising a major portion of at least one alkyl acrylate ester and a minor portion of an ionic monomer. As discussed in Silver the microspheres are prepared utilizing en emulsifier in an amount greater than the critical micelle concentration in the absence of an externally added protective colloid or the like. As such is the case, the ionic comonomer is considered an essential component of the microspheres described therein.

In U.S. Pat. No. 4,266,152 to Baker et al, polymeric microspheres are disclosed wherein said microspheres are formed from non-ionic monomers by suspension polymerization techniques in the presence of ionic suspension stabilizers. Typically, such microspheres are homopolymers and do not contain an ionic comonomer.

U.S. Pat. No. 4,495,318 to Howard discloses inherently tacky polymeric microspheres of a type very similar as those disclosed in the Baker et al patent mentioned above, however, said microspheres are prepared by suspension polymerization techniques utilizing ionic suspension stabilizers and a non-ionic emulsifiers.

A second U.S. Patent to Howard, U.S. Pat. No. 4,598,112 discloses the same type of microsphere as described in his earlier patent except that said microspheres are prepared by suspension polymerization techniques utilizing an ionic stabilizer and a cationic emulsifier.

As is clear from the above noted prior art, polymeric microspheres of the type disclosed required the presence of an internal or external ionic suspension stabilizer means, i.e., either an ionic monomer in a copolymer system or an ionic suspension stabilizer in the absence of an ionic monomer.

It has now been found, that inherently tacky polymeric microspheres which are infuseable, solvent dispersible and solvent insoluble can be prepared using suspension polymerization techniques in the presence of a non-ionic stabilizer and a non-ionic emulsifier.

SUMMARY OF THE INVENTION

The present invention is directed to inherently tacky polymeric microspheres formed from acrylate monomers using suspension polymerization techniques utilizing a non-ionic suspension stabilizer and a non-ionic emulsifier. Said microspheres are particularly useful as a low tack adhesive which can be applied to a sheet material substrate such as paper to provide for a reuseable self-stick note pad product.

DESCRIPTION OF THE PREFERRED EMBODIMENT

In the present invention, a low tack microsphere adhesive is prepared from an alkyl acrylate ester monomer. Exemplary alkyl acrylate ester monomers which are suitable for the preparation of the microspheres of this invention include isooctyl acrylate, 2-ethyl hexyl acrylate and the like which as disclosed in U.S. Pat. No. 4,166,152 to Baker et al referred to above are non-ionic monomers. Such monomers, as homopolymers, generally have glass transition temperatures below about $-20°$ C.

The microspheres of the present invention are generally prepared by aqueous suspension polymerization techniques utilizing a non-ionic suspension stabilizer, an emulsifier and a catalyst or polymerization initiator.

The catalyst or polymerization initiator for polymerizing the monomers to provide the microspheres of the present invention are those which are normally suitable for free-radical polymerization of acrylate monomers and which are oil-soluble and of very low solubility in water, for example, benzoyl peroxide.

The emulsifiers or surfactants used in the practice of the present invention are preferably non-ionic in nature such as, for example, ethoxylated oleyl alcohol. Ionic emulsifiers and mixture of ionic and non-ionic emulsifiers are also contemplated.

The suspension stabilizers that are employed in the preparation of the microspheres of the present invention must be non-ionic in nature in solution and are preferably of the polyvinyl alcohol type.

The polymeric microspheres of the present invention are typically small in size having diameters in the range of about 1 to about 250 microns. Preferably, the diameter of said microspheres range from about 5 to about 150 microns with an average of from about 10 to about 60 microns.

The invention will be more clearly understood with reference to the following examples wherein all parts are by weight unless otherwise specified.

EXAMPLE I

A five-liter, 3 necked flash equipped with a thermometer, mechanical stirrer, reflux condenser and vacuum and nitrogen inlet tube, was charged with a solution containing 23.6 grams of Vinol 523 (tradename for a partially hydrolyzed polyvinyl alcohol of approximately 77,000 to 79,000 molecular weight, commercially available from Air Products, Inc.) and 2636.4 grams of deionized water.

With agitation, concentrated ammonium hydroxide was added to the mixture until a pH of 7.0 was achieved.

To the solution were added 3.7 grams of Lucidol-70 (tradename for a 70% active benzoyl peroxide commercially available from Lucidol Division, Penwalt Corporation) followed by the addition of 1000 grams of 2-ethylhexyl acrylate monomer.

A vacuum was then drawn upon the contents of the flask, the pressure therein being drawn to approximately 25 inches of mercury and maintained while stirring for approximately 5 minutes to assure removal of dissolved air and oxygen.

The vacuum was then broken with nitrogen and a nitrogen purge was maintained throughout the reaction period which follows.

Added to the mixture were 21.5 grams of Trycol OAL-23 (tradename for an oleyl alcohol ethoxylate, nonionic surfactant commercially available from Emery Industries, Inc.) and the agitation rate was set at 300 RPM.

The batch was then heated to 60° C. As the temperature initially approached 60° C., a mild exotherm was noted which raised the temperature to approximately 70° C. Approximately 2.25 hours after the batch hit 60° C., the batch was allowed to cool to room temperature.

The suspension was then filtered through a Tyler No. 14 mesh screen. The resultant homopolymer contained 26.5% solids. Upon standing, the polymer microspheres creamed to the surface, but were readily dispersed by agitating the mixture. The mean particle size as determined by a Model TA Coulter Counter was 28 microns.

EXAMPLE II

The microsphere adhesive prepared in Example I was tested for tackiness by drawing said adhesive on a primed paper sheet using a Number 20 wire-wound rod.

Following the draw down, several one inch strips were cut from said drawn down sheet and and tested to obtain an average tack level for said microsphere adhesive. The strips were tested using a Polyken, Jr. Probe Tack Tester which is manufactured by Testing Machines, Inc. under license from the Kendall Corp. The condition of testing were as follows:

Contact time: 1 second
Separation: 1 cm/second
Contact Pressure: 100 g/cm$^2$
Probe Type: ½ cm diameter stainless steel tip—280 grit abrasive finish
Temperature: 21° C. (approximately)

Further information on the Polyken Probe Tack Tester may be found in ASTM D29 79 Section 15.06, 1983.

The average tack level determined was 80 grams.

From the foregoing description it is apparent that the present invention provides an improved inherently tacky microsphere adhesive using non-ionic ingredients to prepare same. As will be understood by those familiar with the art, the invention may be embodied in other specific forms without departing from the spirit or essential characteristics of the invention.

What is claimed is:

1. A suspension polymerization process for preparing inherently tacky elastomeric polymeric microspheres consisting essentially of the steps of:
    (a) charging to a reaction vessel;
        (i) de-ionized water;
        (ii) at least one non-ionic alkyl acrylate ester monomer;
        (iii) at least one non-ionic emulsifier;
        (iv) a substantially water insoluble polymerization initiator; and
        (v) a non-ionic suspension stabilizer;
    (b) agitating said charge to said reaction vessel;
    (c) heating said charge while maintaining said agitation; and
whereby inherently tacky, elastomeric polymeric microspheres are formed.

2. The process of claim 1 wherein said alkyl acrylate ester monomer is 2-ethyl hexyl acrylate.

* * * * *